Patented July 3, 1934

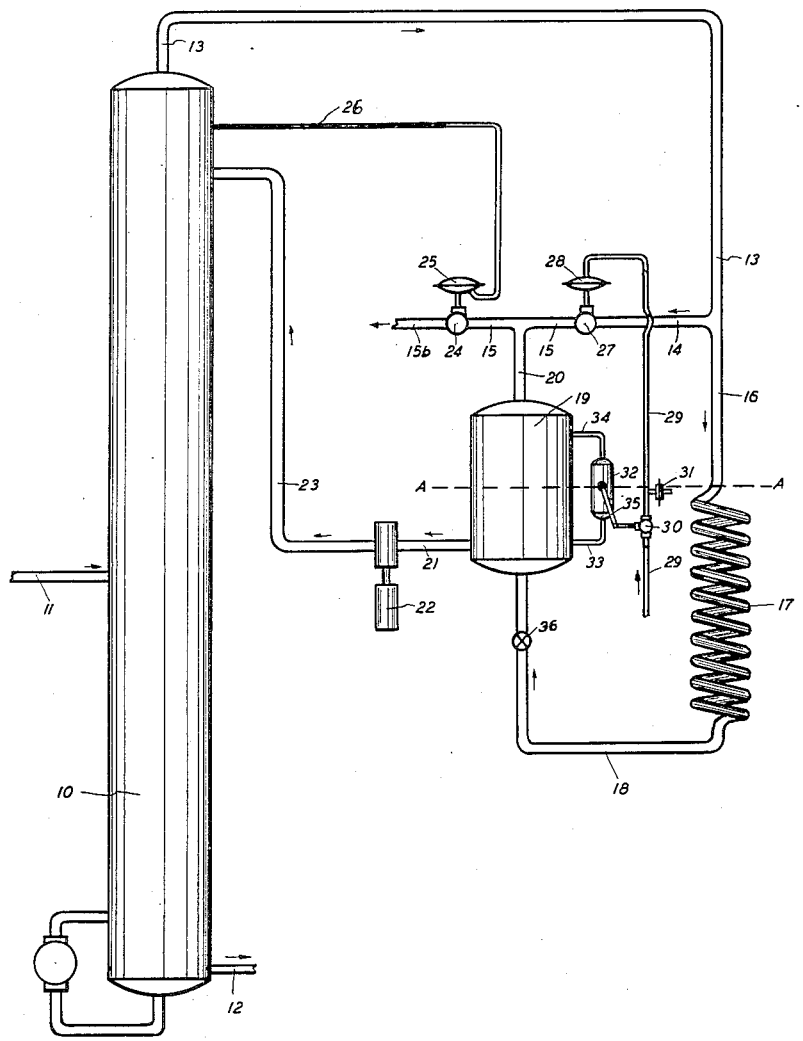

1,965,088

UNITED STATES PATENT OFFICE 1,965,088

REFLUX CONTROL SYSTEM FOR STABILIZING TOWERS

Henry N. Wade, Los Angeles, Calif.

Application March 24, 1933, Serial No. 662,634

5 Claims. (Cl. 196—132)

The object of my invention is to provide means for returning to the top of a stabilizing tower or other fractional condensing device a constant volume stream of a reflux medium.

A stabilizing tower, as is well known, consists essentially of a lower section in which a gasoline, containing dissolved permanent gases and/or undesired highly volatile liquid constituents, is heated to such temperature as to drive off the undesired portion, and an upper section in which the gases and vapors are dephlegmated to return any desired constituents to the residue left by the heating step.

In their usual form, such stabilizers comprise a bubble plate or other fractionating column supplied with raw gasoline at an intermediate point and having a heating means in its lower portion. The stabilized gasoline, stripped of its more volatile elements, is withdrawn from the lower end of the column through a cooling means. Vapors generated in the heated section pass upwardly, counterflowing first the raw gasoline, then a supply of reflux medium which is introduced at substantially the upper end of the tower and which acts as a cooling and washing agent.

By these means and steps, which are now entirely conventional, a sharp fractionation is obtained, all desired constituents are returned to the stabilized gasoline, and the undesired bodies pass out of the top of the column as a warm stream of vapor of highly volatile liquids, which may or may not be accompanied by more or less incondensable gas.

It is customary to provide these columns with means for supplying raw gasoline feed at a constant rate and for maintaining a constant pressure at the base of the column, and it is also usually necessary to operate under a material superatmospheric pressure which must also be constant. In order to maintain constant temperature and pressure conditions and a uniform quality of stabilized product it is also necessary to supply reflux liquid in a stream which will remain constant as to volume when adjusted to any desired delivery rate but which is also readjustable to compensate a change in feed rate or other controllable conditions. As the usual reflux liquid is that which is produced by condensation of the discarded vapors and as this condensate, by reason of its volatility, must be stored under pressure, and as almost all pumping devices vary in delivery with any material change in pressure difference between suction and discharge, the production and maintenance of a supply of this liquid and its return to the stabilizer in controllably constant volume has proven to be a matter of some difficulty. It is to this end that my invention is directed.

The invention is best described in connection with the attached drawing which diagrammatically illustrates a suitable apparatus for putting it into effect.

Referring to the drawing, 10 is any stabilizing tower, raw gasoline being fed through a pipe 11 while stabilized gasoline is withdrawn through a pipe 12. This column is assumed to be supplied with means for feeding at a desired rate, for maintaining a desired base temperature and for withdrawing and cooling the stabilized gasoline. These provisions are well known and understood, are no part of my invention and are not described.

The dephlegmated waste vapors leave the column through pipe 13 and are directed through pipes 14 and 15 to a vent 15b which may lead to a fuel gas pipe line or accumulator or to any other point of disposal of waste or residual gases and vapors.

From pipe 13 a branch pipe 16 leads to the upper end of a condenser 17, the lower end of which is connected by a pipe 18 into the lower end of a pressure storage tank 19. A pipe 20 affords communication between the top of this tank and pipe 15. A pipe 21 connects the lower portion of the tank to the suction side of a pump 22 from which a discharge pipe 23 is carried to the upper portion of the tower.

The pump 22 may be of any form adapted to maintain a constant delivery under constant head, as for example a piston pump with automatic speed control or a centrifugal pump. The constant head is provided by the arrangements about to be described.

The condenser 17 may be cooled in any desired manner but must be of such form that it may become internally flooded with condensate, in order that a pressure difference between its ends will cause the liquid level within the condenser to rise or fall and thus expose less or more condensing surface to contact with vapors. It should also be set with its upper end not higher than the predetermined liquid level in tank 19, for reasons which will appear.

At the end of pipe 15 and adjoining the final vent I place a valve 24 controlled by a diaphragm unit 25 and connect the chamber of this unit to the upper end of the stabilizing column by means of pipe 26. The pipe 26 may connect below the diaphragm as shown or suitable linkage may be used to cause the valve to move in an opening direction in response to a rise in pressure in the stabilizer. This arrangement is conventional.

Between pipes 14 and 15 I interpose a valve 27 controlled by a diaphragm unit 28 and connect the chamber of this unit by a pipe 29 to any source, not shown, of gas or air under pressure. In this pipe I place a pilot valve 30 and a leakage orifice indicated at 31, these elements being so arranged and connected with the diaphragm unit 28 that valve 27 will move in a closing direction when valve 30 opens sufficiently to pass more air or gas than will escape through the leakage orifice.

Alongside tank 19 I place a float chamber 32 which communicates with the upper and lower portions respectively of the tank through pipes 33 and 34. In this chamber I place any float, not shown, arranged to actuate an external swinging arm 35 which is linked in any suitable manner to pilot valve 30. This linkage should be so arranged that when the liquid level in the tank and the communicating float chamber falls below a predetermined point (as, for example, that indicated by the broken line A—A) the valve 30 will be actuated in an opening direction.

The above description, insofar as it refers to the float chamber, the pilot valve and orifice and the diaphragm chamber 28, is purely illustrative and may be materially varied or entirely substituted without departing from the spirit of my invention. For instance, the float may be placed within tank 19 instead of in an external chamber; the float arm may be mechanically linked to valve 27, eliminating the pilot valve, orifice and gas supply, or a magnetic valve at location 27 may be actuated and controlled by mercury tube or other pressure responsive contact devices. Many such control means are well known and understood, and the only essential is the provision of a means for actuating valve 27 in a closing direction in response to a lowering of the liquid level in tank 19, and vice versa.

The above described apparatus functions in the following manner.

The valve and diaphragm unit 24—25, being directly responsive to pressure in the stabilizer, tend to maintain a constant pressure in that element and assist in maintaining a substantially constant but somewhat lower pressure in pipes 15 and 20.

Assuming the tank and condenser system to be already filled with liquid to the predetermined level A—A and valve 27 to be wide open, the stabilizer pressure is impressed equally on the upper surfaces of the liquid columns in tank 19 and pipe 16, the liquid in these two elements is in hydrostatic balance and the condenser (in the position shown) is completely flooded and therefore nonfunctional.

On the withdrawal of liquid from the tank, as by starting pump 22, the liquid level in the tank is depressed, causing valve 27 to partially close. The throttling of the vapor stream thus occasioned slightly raises the pressure in pipe 14 and hence on the stabilizer. The increase in stabilizer pressure causes valve 24 to slightly open, thereby slightly reducing the pressure in pipe 15. The effect of these two valve movements is therefore to produce a pressure drop across valve 27 (i. e., between pipes 14 and 15) which is the sum of the effects of the two movements. As pipe 14 is in communication with the upper end of the condenser while pipe 15 is in communication with the space above the liquid column in tank 19, this total pressure difference is available to displace liquid from the lower end of the condenser into the tank.

This displacement of liquid from the condenser to the tank tends to restore the original liquid level in the tank and at the same time uncovers previously flooded condenser surface, on which surface new condensate is immediately formed to replace the quantity displaced. Finally, the restoration of the original liquid level opens valve 27, thus removing the prime cause of the differential pressure and terminating the displacement.

While the above description might suggest a succession of pressure changes of considerable magnitude, it has been found that in actual operation valve 27 arrives at a floating position whereby it throttles the vapor stream passing from pipe 14 to pipe 15 to just such extent as to produce the pressure drop requisite to divert to the condenser sufficient vapor to maintain the desired reflux rate. Likewise, valve 24 tends to arrive at a floating position in which it is just sufficiently opened to continuously discharge the final discard vapor at the required rate.

While it is by no means essential to the successful operation of the above device, I often find it desirable to introduce into pipe 18 the check valve indicated at 36, by which downward movement of the liquid column in that leg of the U-bend 18 is prevented, this valve operating to prevent hunting of the level in tank 19 and assisting in maintaining the balanced or floating position of the control valves above described.

Given a pressure in the reflux supply tank substantially equal to the pressure in the stabilizer and also substantially constant, the difficulties heretofore encountered in delivering a reflux stream of constant and controllable volume are eliminated. The pump becomes little more than a measuring device from which slip is practically eliminated by the balancing of suction and discharge pressures. This not only immeasurably increases the accuracy of the pump as a means for measuring, but also renders it highly responsive to manual control, to automatic governing to constant speed or to thermostatic governing in response to temperatures at the column head.

The apparatus above described provides at all times such quantities of reflux liquid as may be required, responds instantly to a change in demand and is independent of weather conditions. The storage tank may be, in fact preferably is, of small capacity and this tank and its accompanying condenser may be set in any convenient location, above, below and at any preferred distance from the stabilizer.

An outstanding advantage of my invention is that no more vapor is condensed than is required for the reflux supply, the remainder of the vapor being delivered from the vent as a warm vapor or mixture of vapor with permanent gas. The freezing of valves which occurs when the pressure on such highly volatile liquids as propane is released is thus entirely avoided.

The advantages of the above arrangement of tank, condenser and control valves may be realized even in cases where the effluent from the stabilizer is a mixture of vapor with a material proportion of gas incondensible at the temperature and pressure of the condenser. In such cases the condenser will, on complete interruption of the demand for condensate, become flooded either with condensate or with residual gas, but while condensate is being withdrawn from the tank the residual gas will travel with the condensate into the tank, rise through the liquid therein and escape through pipe 20.

I would point out that the flooded condenser feature of my invention may be utilized with valve arrangements other than that described herein. For example, if the dephlegmating system operates at substantially atmospheric pressure, valve 24 may be eliminated, valve 27 functioning alone to produce the pressure differential by which the condensate is transferred to the tank.

I claim as my invention:

1. In combination with a fractionating column operating under superatmospheric pressure and having a vapor outlet pipe, a reflux return system comprising: a pressure control valve in said vapor pipe and means responsive to pressure within said column arranged to operate said valve; a vertically arranged condenser having its upper end communicating with said vapor pipe; a reflux supply tank having its upper portion in communication with said vapor pipe and its lower portion in communication with the lower end of said condenser; a valve in said vapor pipe arranged to throttle the flow of vapor from said column toward said pressure control valve, said throttling valve being situated between the points of communication between said vapor line and said condenser and said supply tank respectively; means responsive to variations of liquid level within said supply tank operatively connected to said throttling valve, and means for returning liquid from said tank to the upper portion of said column.

2. In combination with a fractionating column having a vapor outlet pipe, a reflux return system comprising: a condenser and a reflux supply tank having their respective lower ends in communication, said condenser being so arranged as to be flooded by condensate accumulating in said tank above a predetermined level; means of communication between the respective upper portions of said condenser and said tank and spaced points along said vapor pipe; a valve in said vapor pipe between said points; means responsive to a lowering of liquid level in said tank arranged to actuate said valve in a closing direction, and means for returning liquid from said tank to the upper portion of said column.

3. In combination with a fractionating column having a vapor outlet pipe, a reflux return system comprising: a throttling valve in said vapor pipe; a reflux supply tank communicating at its upper end with said vapor pipe downstream said valve; a condenser communicating at its upper end with said vapor pipe upstream said valve, said condenser being at a lower level than said tank; a channel connecting the lower end of said condenser with the lower portion of said tank; means responsive to lowering of liquid level within said tank arranged to actuate said valve in a closing direction, and means for returning liquid from said tank to said column.

4. In combination with a fractionating column, a reflux return system comprising: a reflux supply receiver; a substantially vertical condenser arranged to take vapor from said column and to be flooded by condensate accumulating in said receiver; means responsive to changes of liquid level in said receiver for varying the liquid level in said condenser and the area of momentarily effective condensing surface thereof, and means for returning liquid from said receiver to said column.

5. In combination with a fractionating column, a reflux return system comprising: a reflux supply receiver; a substantially vertical condenser arranged to take vapor from said column and to be flooded by condensate accumulating in said receiver; means responsive to changes of liquid level in said receiver for varying the relative pressures existing in the vapor spaces in said receiver and said condenser, thereby varying the liquid level in said condenser and the area of momentarily effective condensing surface thereof, and means for returning liquid from said receiver to said column.

HENRY N. WADE.